Sept. 27, 1955  A. J. HILGERT  2,719,201
THERMOSTAT
Filed Jan. 8, 1952
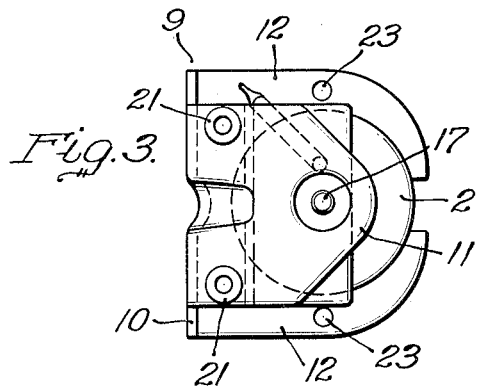
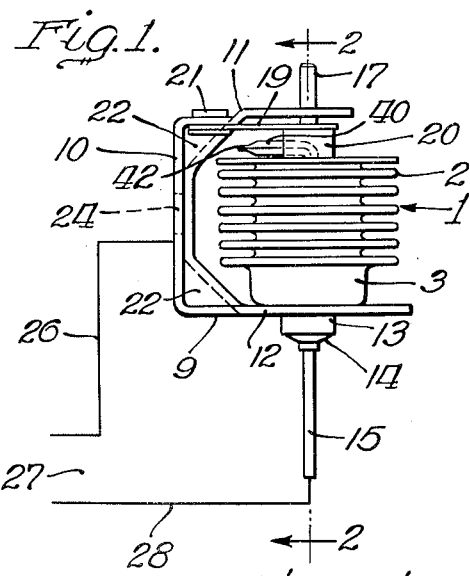
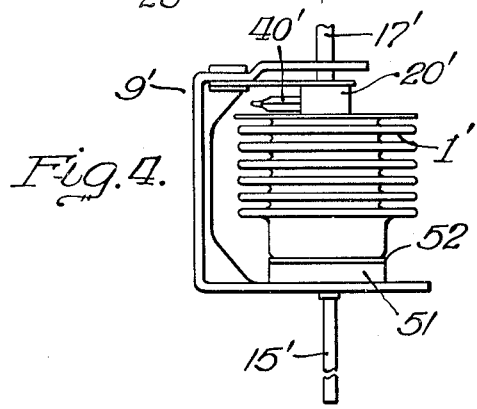
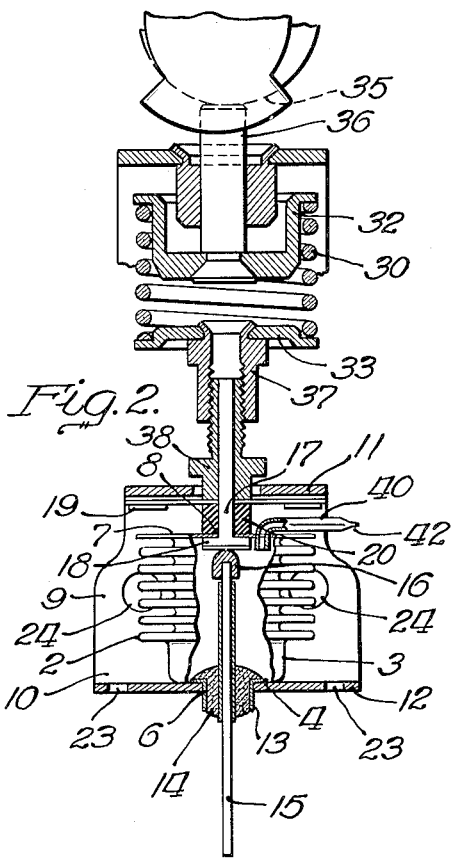
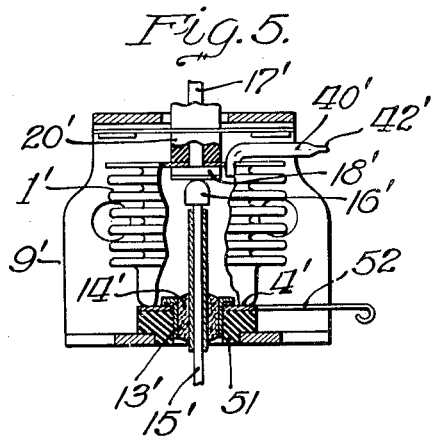
INVENTOR.
Adolph J. Hilgert
BY
Brown, Jackson, Boettcher & Dienner
Attys.

United States Patent Office 2,719,201
Patented Sept. 27, 1955

2,719,201

THERMOSTAT

Adolph J. Hilgert, Milwaukee, Wis., assignor to Milwaukee Gas Specialty Company, Milwaukee, Wis., a corporation of Wisconsin Application January 8, 1952, Serial No. 265,445

12 Claims. (Cl. 200—140)

This invention relates, in general, to electric switches, and has particular relation to a thermally actuated switch.

Thermally actuated electric switches of the type to which the present invention particularly appertains are known in the art as thermostats.

While the particular device which I shall describe hereinafter in connection with the drawings is adapted for use for regulating automatically the temperature produced by heating apparatus, especially heating apparatus under thermoelectric control, and, more particularly, for maintaining the temperature of a room or other space at a definite degree, it is to be understood that the device may be used for controlling other apparatus, or for making, breaking, or changing the connections in one or more electric circuits for heaters or other devices as suitable or desired.

In prior practice, thermostats of the bimetallic type have commonly comprised strips of different metals welded or braised together and operated by distortion of such strips caused by unequal expansion of the metals with increase in temperature. The manufacture of such thermostats has involved hot rolling and pressing operations which have been complicated and expensive and have required considerable skill. It has also been necessary to make such thermostats relatively long to provide the desired action. Their mass has been relatively large, and they have not been as small and compact or sensitive as may be desired. Moreover, in bimetal thermostats, the strip with the greater coefficient of expansion, in order to match the stronger strip with the lesser coefficient of expansion, has usually been of substantially more mass, which creates insensitivity in the device.

Thermostats comprising an expansible and contractible bellows containing a volatile fluid adapted to expand and contract with accompanying expansion and contraction of the bellows upon temperature changes, and cooperating contact means arranged to be separated and engaged by expansion and contraction of the bellows have also been proposed. Where the contact means of these bellows type devices have been disposed within the bellows, they have usually comprised one or more pools of mercury. It has been found that if a mercury contact is employed and the mercury wets the other contact, the meniscus of the merucy at the other contact creates an extremely large differential, which renders the device unsuitable as a sensitive thermostat.

One of the main objects of the present invention is to provide an improved thermostat which will overcome shortcomings of prior bimetallic and bellows-type thermostats, and, more particularly, an improved thermostat which is more sensitive than prior thermostats, and compact, and of relatively low mass and high action.

Another object is to provide an improved thermostat assemby of the class described that may be tilted or jarred without affecting the electrical connection.

Another object is to provide an improved thermostat in which a solid contact-to-solid contact make and break arrangement is provided within a sealed and expansible and contractible container containing a volatile or other expansible and contractible fluid which not only acts to expand and contract the container to separate and engage the contacts upon temperature changes, but which fluid, by disposition of the contacts therein, also acts to keep the contacts clean.

Another object is to provide a device wherein there is a bracket having portions thereof embracing the expansible and contractible container endwise to prevent over-expansion thereof, and which bracket and the expansible and contractible container with the solid contacts therein constitute a simple, compact and unitary assembly which is readily replaceable in the event the container or other part of the device is cracked or injured.

Another object is to provide a leaf spring arrangement attached to the bracket for guiding the bellows for substantially linear movement.

Another object is to provide an improved device wherein over-contraction of the expansible and contractible container is prevented by the solid contact-to-solid contact make and break arrangement, whereas over-expansion of the container is prevented by the bracket means.

Further objects and advantages, and numerous adaptations of the invention will appear from the following detailed description, taken in connection with the accompanying drawings.

In the drawings:

Figure 1 is a side elevational view of a thermostat embodying the present invention;

Figure 2 is a longitudinal axial section taken on the line 2—2 of Figure 1 and showing fragmentarily adjustment means for the thermostat;

Figure 3 is an end view of the device shown in Figures 1 and 2;

Figure 4 is a side elevational view of another form of thermostat embodying the present invention; and Figure 5 is a longitudinal axial section taken on the line 5—5 of Figure 4.

Referring first to Figures 1–3, in the embodiment of the invention therein illustrated the expansible and contractible container is in the form of a flexible metallic bellows or sylphon 1 having a flexible corrugated side wall 2 provided at one end with an integral cup-shaped part 3. The cup-shaped part 3 has an integral end wall 4 provided with an axial opening 6. At its opposite end the bellows 1 has an end wall 7 provided with an axial opening 8.

A stamped metallic bracket 9 has a base 10, and integral outstanding legs 11 and 12 which embrace or straddle the bellows 1 endwise. The end wall 4 is fixedly secured to the leg 12 and in good contact therewith, for example, by a flanged sleeve 13 within which is secured a glass or other suitable seal 14 which seals the adjacent end of the bellows. A conductor 15 extends into the interior of the bellows 1 through the seal 14 and carries within the bellows a contact 16 which may be soldered or otherwise secured to the inner end of the conductor 15 and constitutes the fixed contact of the thermostat.

A contact stem 17 has integral therewith and disposed within the bellows 1 in axial alignment with the contact 16 a contact 18 which constitutes the movable contact of the device. The stem 17 extends out through the opening 8 and through an opening in a metallic leaf spring 19 adjacent which the stem 17 is attached to the spring 19. The stem 17 also extends through an enlarged opening in the leg 11 with ample clearance therebetween to receive a bellows-adjusting member as will hereinafter appear. An insulating sleeve 20 closely surrounds the stem 17 and is interposed endwise between the spring 19 and the end wall 7 of the bellows. The sleeve 20 constitutes a spacer between the spring 17 and the end wall 7 of the bellows 1.

The spring 19 is attached, for example, by rivets or the like 21 to the leg 11 of the bracket 9. The bracket 9 has strengthening ribs 22 stamped inwardly therefrom. These ribs 22 give rigidity to the bracket 9, and the spring 19 is flexible and, by attachment to the stem 17, guides the movable end of the bellows for substantially linear movement.

The base 10 of the bracket 9 has aperture 24 for receiving, for example, one or more screws (not shown) for mounting the bracket and connecting a terminal bracket (not shown) in circuit with the bracket 9. For purposes of illustration, a lead conductor 26 of an electric circuit 27 which the thermostat is adapted to open and close is connected to the bracket 9. The conductor 28 forming the other side of the electric circuit is connected to the conductor 15. Thus when the movable contact 18 is in contact with the fixed contact 16 the electric circuit is completed, for example, from the conductor 26 through the bracket 9 and wall of the bellows 1 to the contact 18, and thence through the engaging contact 16 and conductor 15 to the conductor 28.

The interior of the bellows 1 is filled with a volatile fluid which is adapted to expand and contract with accompanying expansion and contraction of the bellows 1 upon changes in ambient temperature at the position at which the bellows 1 is disposed. This volatile fluid should be so selected that for any given temperature range the vapor pressure change per degree Fahrenheit of the particular fill should be high enough so atmospheric pressure changes do not seriously shift the control point of the thermostat. However, the upper limit of pressure developed in the bellows should not exceed its mechanical limitations. Illustrative of such fluid fills are butane (which is a colorless gaseous compound—$C_4H_{10}$— of the aliphatic hydrocarbon or marsh-gas series), which at 70° F. will exert a pressure of approximately 31 pounds; isobutane, which at 70° F. will exert a pressure of approximately 45 pounds; sulphur dioxide ($SO_2$), which at 70° F. will exert a pressure of approximately 50 pounds; methyl chloride ($CH_3Cl$), which at 70° F. will exert a pressure of approximately 72 pounds; "S–12" or Freon ($CCl_2F_2$), which at 70° F. will exert a pressure of approximately 85 pounds; and propane ($C_2H_8$), which at 70° F. will exert a pressure of approximately 120 pounds. Moreover, the contacts are thereby at all times bathed in the volatile fluid and kept clean.

Other fills than those above indicated are contemplated within the scope of the present invention. If desired, a sub-atmospheric fill may be used as disclosed and claimed in the copending application of John A. Wolff, Serial No. 266,626, filed January 16, 1952. Such a fill has the advantage that, in case of rupture of the bellows, atmosphere will enter the bellows and expand the same, thereby separating the contact 18 from the contact 16 and opening the circuit so that the device will fail safe. Where the pressure of the fill is greater than atmospheric pressure and rupture of the bellows occurs, the fill will leak out, with resulting contraction of the bellows and closing of the contacts. In the case of fills of the last-mentioned type, the bellows should, of course, be guarded against rupture.

Isopropyl alcohol is an example of a sub-atmospheric fill for a maximum setting of about 180° F. N-propyl alcohol is suitable for a maximum setting of about 200° F. Isobutyl alcohol is suitable for a maximum setting of about 220° F. N-butyl alcohol is suitable for a maximum setting of about 240° F. Isoamyl alcohol is suitable for a maximum setting of about 260° F. M-xylene is suitable for a maximum setting of about 280° F., and P-cymene is suitable for a maximum setting of about 340° F. These fills are illustrative of suitable sub-atmospheric fills for a thermostat for use as a high temperature limit switch device.

In the use of the thermally actuated switch shown in Figures 1–3, it is positioned in the room or other space or where it will be otherwise subjected to the temperature which it is desired to maintain, or to the temperature at which the switch is intended to open and close.

Where, for example, the device is used as a thermostat for regulating automatically the temperature produced by heating apparatus to maintain the temperature of a room or space at a definite degree, it is positioned in such room or space where it will be subject to the ambient temperature therein. When the ambient temperature rises above the temperature for which the device is set, the volatile fluid within the bellows 1 expands, with the result that the bellows expands endwise causing the contact 18 to move out of contact with the contact 16. This opens the circuit shown diagramatically at 26, 28, which results in shutting off the heating action of a heater (not shown), for example, by shutting off the flow of fuel to the burner at the heater.

When the ambient temperature drops below the temperature for which the thermostat is set, the volatile fluid within the bellows 1 contracts with accompanying endwise contraction of the bellows, for example, under the action of a spring 30 which is shown confined endwise between a cup 32 and a plate 33.

Temperature adjusting means is provided for adjusting the temperature for which the thermostat is set. A cam shown fragmentarily at 35, when turned, pushes a stem 36 downwardly (Figure 1) to compress the spring 30 which, by its bearing against the plate 33, forces an adjustment screw 37 downwardly to put pressure on the end wall 7 of the bellows. The adjustment screw 37 has screwed engagement with a second threaded part 38, and the parts 37 and 38 can be turned relative to each other to effect a factory adjustment of the device.

The bellows 1 may be provided with a piece of copper tubing 40 having an angular end opening through the end wall 7 through which the desired fill may be introduced into the bellows. After the fill is introduced, the outer end of the tube 40 may be pressed together or deformed to close the same at 42.

While the present invention is not limited to a thermostat of particular dimensions, it may be pointed out that in one satisfactory embodiment of the invention the bellows is of a length of about 9/16 of an inch and of a diameter of about 11/16 of an inch, with a copper tubing 40 about 3/64 of an inch outside and about one inch long. The dimensions of the other parts are shown generally in proportion to the dimensions above set forth.

It will be noted that, in the use of the device, the solid contact 16-to-solid contact 18 avoids the large differential produced by the meniscus of a mercury contact if it wets the other contact. The solid contact-to-solid contact has further advantages; it provides an improved thermostat assembly that may be tilted or jarred without affecting the electrical connection; and it limits the contraction of the bellows preferably within relatively small limits. With the bellows 1 interposed between the legs 11 and 12 of the bracket 9 and the end wall 4 of the bellows secured to the leg 12, the leg 11 limits the expansion of the bellows also preferably within relatively narrow limits. The thermostat is in the form of a simple, compact, and unitary assembly which is readily replaceable, and over-expansion as well as over-contraction of the bellows are prevented.

In the embodiment of the invention shown in Figures 4 and 5, the bellows 1' is substantially the same as the bellows shown in Figures 1 and 2. The bracket 9', and the spring 19' are also substantially the same as the bracket 9 and spring 19 shown in Figures 1 and 2. The flanged sleeve 13' and end wall 4' of the bellows, instead of being in contact with the metallic bracket 9', have an insulating sleeve or eyelet 51 interposed between them and the bracket 9'. A terminal conductor 52 is held between the sleeve 51 and the end wall 4', and in good electric conducting contact with this end wall. The seal 14' is similar to the seal of the preceding embodiment of the invention. The contacts 16' and 18' are disposed within the fill inside the bellows 1'.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. A temperature responsive device comprising a hermetically sealed enclosure expansible and contractible in response to changes in ambient temperature and having a movable end movable with said expansion and contraction of said enclosure, a first relatively fixed contact sealed within said enclosure, a cooperating second contact sealed within and coacting with said enclosure to tend to move in a direction away from said first contact upon expansion of said enclosure and toward said first contact upon contraction of said enclosure, said first contact coacting endwise with said second contact to limit the contraction of said enclosure and the tendency of said second contact to move toward said first contact, a helical compression spring in force transmitting coaction with said movable end of said enclosure for biasing said second contact toward said first contact, and manually adjustable abutment means coacting with the end of said spring remote from said enclosure for adjusting the biasing action of said spring.

2. A temperature responsive circuit controlling device according to claim 1 wherein each of the cooperating contacts is of solid construction.

3. A temperature responsive circuit controlling device according to claim 1 wherein there is a volatile fill sealed in said enclosure with said contacts and in which the latter are immersed.

4. A temperature responsive device according to claim 1 wherein there is adjustable means for factory adjustment of the loading of said compression spring.

5. A temperature responsive device according to claim 1 wherein the compression spring is interposed endwise between said manually adjustable abutment means and a second abutment means having biasing coaction with said movable end of said enclosure.

6. A temperature responsive device comprising a hermetically sealed enclosure expansible and contractible in response to changes in ambient temperature and having a movable end movable with said expansion and contraction of said enclosure, a first relatively fixed contact sealed within said enclosure, a cooperating second contact sealed within and coacting with said enclosure to tend to move in a direction away from said first contact upon expansion of said enclosure and toward said first contact upon contraction of said enclosure, said first contact coacting endwise with said second contact to limit the contraction of said enclosure and the tendency of said second contact to move toward said first contact, a pair of abutment members externally of said enclosure and substantially coaxial with said enclosure with one of said abutment members in biasing coaction with said movable end of said enclosure, a helical compression spring interposed between said abutment members and in force transmitting coaction with said movable end of said enclosure through said one abutment member for biasing said second contact toward said first contact, and a manually adjustable cam coacting with the other abutment member for adjusting the biasing action of said spring.

7. A temperature responsive device according to claim 6 wherein there is adjustable means substantially coaxial with said compression spring for factory adjustment of the loading of said compression spring.

8. In a device of the class described, in combination, a temperature responsive expansible and contractible hermetically sealed bellows having a portion movable directly and continuously with expansion and contraction of said bellows, electric circuit controlling means having high sensitivity and low differential and comprising a first contact sealed within said bellows, a second contact sealed within said bellows and coacting with said first contact, said second contact coacting with said movable portion of said bellows for movement directly and continuously in directions toward and from said first contact with movement of said movable portion of said bellows, said first contact coacting endwise with said second contact to limit movement of said second contact toward said first contact, and a volatile fill sealed within said bellows and which expands and contracts directly and continuously responsive to changes in temperature externally of said bellows, and independently of current flow through said coacting contacts, with accompanying movement of said movable portion of said bellows and accompanying slow movement of said second contact with respect to said first contact throughout the range of operation of the device.

9. In a device of the class described, in combination, a temperature responsive expansible and contractible hermetically sealed bellows having a portion movable directly and continuously with expansion and contraction of said bellows, electric circuit controlling means having high sensitivity and low differential and comprising a first contact sealed within said bellows, a second contact sealed within said bellows and coacting with said first contact, said second contact coacting with said movable portion of said bellows for movement directly and continuously in directions toward and from said first contact with movement of said movable portion of said bellows, said first contact coacting endwise with said second contact to limit movement of said second contact toward said first contact, and a volatile fill sealed within said bellows and which expands and contracts directly and continuously responsive to changes in temperature externally of said bellows, and independently of current flow through said coacting contacts, with accompanying movement of said movable portion of said bellows and accompanying slow movement of said second contact with respect to said first contact throughout the range of operation of the device, said coacting contacts being low resistance contacts and said hermetic sealing of said contacts within said bellows maintaining said contact resistance low and said sensitivity high and differential low over the lifetime of the device.

10. In a device of the class described, in combination, a temperature responsive expansible and contractible hermetically sealed bellows having a portion movable directly and continuously with expansion and contraction of said bellows, electric circuit controlling means having high sensitivity and low differential and comprising a first contact sealed within said bellows, a second contact sealed within said bellows and coacting with said first contact, said second contact coacting with said movable portion of said bellows for movement directly and continuously in directions toward and from said first contact with movement of said movable portion of said bellows, said first contact coacting endwise with said second contact to limit movement of said second contact toward said first contact, a volatile fill sealed within said bellows and which expands and contracts directly and continuously responsive to changes in temperature externally of said bellows, and independently of current flow through said coacting contacts, with accompanying movement of said movable portion of said bellows and accompanying slow movement of said second contact with respect to said first contact throughout the range of operation of the device, and range adjustment means operable to adjust the temperature at which said electric circuit controlling means is effective, the high sensitivity and low differential of the device being substantially unaffected by adjustment of said range adjustment means.

11. In a device of the class described, in combination, a temperature responsive expansible and contractible hermetically sealed bellows having a portion movable directly and continuously with expansion and contraction of said bellows, electric circuit controlling means having high sensitivity and low differential and comprising a first contact sealed within said bellows, a second contact sealed within said bellows and coacting with said first contact, said second contact coacting with said movable portion of said bellows for movement directly and continuously in directions toward and from said first contact with movement of said movable portion of said bellows, said first contact coacting endwise with said second contact to limit movement of said second contact toward said first contact, a volatile fill sealed within said bellows and which expands and contracts directly and continuously responsive to changes in temperature externally of said bellows, and independently of current flow through said coacting contacts, with accompanying movement of said movable portion of said bellows and accompanying slow movement of said second contact with respect to said first contact throughout the range of operation of the device, and factory adjustment means operable to adjust the temperature at which said electric circuit controlling means is effective, the high sensitivity and low differential of the device being substantially unaffected by adjustment of said factory adjustment means.

12. In a device of the class described, in combination, a temperature responsive expansible and contractible hermetically sealed bellows having a portion movable directly and continuously with expansion and contraction of said bellows, electric circuit controlling means having high sensitivity and low differential and comprising a first contact sealed within said bellows, a second contact sealed within said bellows and coacting with said first contact, said second contact coacting with said movable portion of said bellows for movement directly and continuously in directions toward and from said first contact with movement of said movable portion of said bellows, said first contact coacting endwise with said second contact to limit movement of said second contact toward said first contact, a volatile fill sealed within said bellows and which expands and contracts directly and continuously responsive to changes in temperature externally of said bellows, and independently of current flow through said coacting contacts, with accompanying movement of said movable portion of said bellows and accompanying slow movement of said second contact with respect to said first contact throughout the range of operation of the device, a helical compression spring in force transmitting coaction with said movable portion of said bellows for biasing said second contact into contact with said first contact, manually adjustable abutment means for adjusting the biasing action of said spring to adjust the temperature at which said electric circuit controlling means is effective, and factory adjustment means operable to adjust the temperature at which said electric circuit controlling means is effective, the high sensitivity and low differential of the device being substantially unaffected by adjustment of said manually adjustable abutment means and adjustment of said factory adjustment means.

References Cited in the file of this patent

UNITED STATES PATENTS

| | | |
|---|---|---|
| 243,345 | Lungen | June 21, 1881 |
| 360,823 | Singer | Apr. 5, 1887 |
| 1,265,765 | Ferris | May 14, 1918 |
| 1,332,469 | Matthews | Mar. 2, 1920 |
| 1,666,192 | Bolling | Apr. 17, 1928 |
| 1,822,408 | King | Sept. 8, 1931 |
| 2,112,750 | Price | Mar. 29, 1938 |
| 2,318,480 | Griffith | May 4, 1943 |